United States Patent [19]

Tanisake et al.

[11] Patent Number: 5,045,627
[45] Date of Patent: Sep. 3, 1991

[54] MELT-PROCESSABLE COPOLYESTER

[75] Inventors: Hiroka Tanisake; Koji Yamamoto; Toshizumi Hirota, all of Hiratsuka, Japan

[73] Assignee: Mitsubishi Gas Chemical Company, Inc., Tokyo, Japan

[21] Appl. No.: 394,419

[22] Filed: Aug. 16, 1989

Related U.S. Application Data

[63] Continuation-in-part of Ser. No. 228,312, Aug. 4, 1988, abandoned.

[30] Foreign Application Priority Data

Aug. 11, 1987 [JP] Japan .................................. 62-199084
Mar. 17, 1988 [JP] Japan .................................. 63-61872
Mar. 17, 1988 [JP] Japan .................................. 63-61873

[51] Int. Cl.$^5$ ..................... C08G 63/02; C08G 63/18
[52] U.S. Cl. ................................. 528/271; 528/176; 528/193; 528/194; 528/272
[58] Field of Search ................ 528/176, 193, 194, 271, 528/272

[56] References Cited

U.S. PATENT DOCUMENTS 3,873,504  3/1975  Boettcher et al. .................. 528/194
4,238,598 12/1980  Favstritsky ......................... 528/194
4,238,599 12/1980  Langley et al. ..................... 528/194
4,346,208  8/1982  Fayolle ............................. 528/194

Primary Examiner—Harold D. Anderson
Assistant Examiner—T. Mosley
Attorney, Agent, or Firm—Wenderoth, Lind & Ponack

[57] ABSTRACT

A melt-processable copolyester consisting essentially of:
a structural unit (I) of formula (1-1)

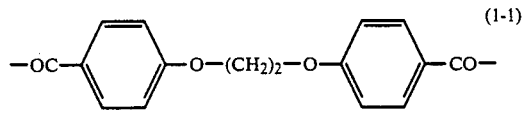

and formula (1-2)

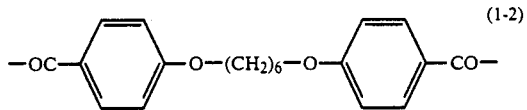

wherein the amount of the species of formula (1-2) is 5 to 95 mole % of the structural unit (I),
a structural unit (II) of formula (2)

$$-O-X-O- \qquad (2)$$

wherein X is at least one selected from the group consisting of

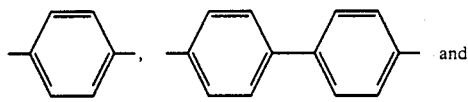

and

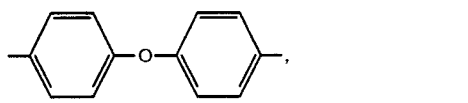

and
a structural unit (III) of formula (3)

$$-O-Y-CO- \qquad (3)$$

wherein Y is at least one selected from the group consisting of

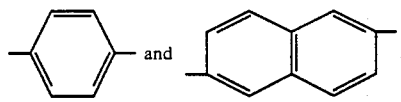

the proportion of the structural unit (III) being 10 to 80 mole % of the structural units (I)+(II)+(III) in total, the structural unit (I) being substantially equimolar to the structural unit (II) and inherent viscosity (ln $\eta_{rel}$)/C, measured in a concentration of 0.16 g/dl in pentafluorophenol at 60° C., being not less than 0.5 dl/g.

7 Claims, No Drawings

MELT-PROCESSABLE COPOLYESTER

This application is a continuation-in-part of now abandoned application Ser. No. 228,312 filed Aug. 4, 1988.

FIELD OF THE INVENTION

This invention relates to a novel copolyester which is melt-processable at a temperature below about 300° C. and is capable of giving molded articles having excellent heat resistance, high heat distortion temperature and hydrolysis resistance.

DESCRIPTION OF THE PRIOR ART

Aromatic polyesters such as polyethylene terephthalate and polybutylene terephthalate have been hitherto widely used in molded articles such as fibers, films, etc., owing to their high crystallinity, high softening point and excellent mechanical strength. However, they are not necessarily Satisfactory in respect a heat resistance.

With a recent increase in demand for higher performance of materials accompanied by development of higher technologies, a variety of polyesters having various novel performances have been developed, and they are commercially available.

Above all, a thermotropic liquid crystal polyester, which exhibits optical anisotropy in a melt phase, attracts attention since it has excellent properties.

The thermotropic liquid crystal polyester greatly differs from conventional polyesters used widely in industry such as polyethylene terephthalate, polybutylene terephthalate, etc. In the thermotropic liquid crystal polyester, its molecular chain does not bend easily even in a melt phase or maintains a rod-like shape, its molecule does not tangle much with another when melted, it exhibits a specific flow behavior of one directional orientation by a small shear stress, and when it is cooled in an oriented state, it solidifies in the oriented state. Thus, the thermotropic liquid crystal polyester has excellent melt-processability, mechanical property and heat resistance.

As this thermotropic liquid crystal polyester, a wholly aromatic polyester derived from p-hydroxy benzoic acid and 6-hydroxy-2-naphthoic acid as main Components is known as shown in U.S. Pat. No. 4,161,470. Said wholly aromatic polyester has excellent mechanical properties and heat resistance. Since, however, 6-hydroxy-2-naphthoic acid as a material is expensive and the resulting polymer is hence expensive, the increase in demand therefor is limited.

On the other hand, as shown in U.S. Pat. No. 3,778,410, a copolyester obtained by polycondensation of polyethylene terephthalate under acidolysis with p-acetoxy benzoic acid has a low melt-processing temperature of about 240–260° C. Therefore, this copolyester is melt-moldable in an ordinary in3action molding machine usable for molding of polyetylene terephthalate, polybutylene terephthalate, etc., and it is known as a relatively less expensive thermotropic liquid crystal polyester. However, this polyester has in that its heat resistance is not satisfactory, since its heat distortion temperature is about 65–70° C. in that its hydrolysis resistance is inferior to those of wholly aromatic polyesters.

It was recently reported in U.S. Pat. No. 4,746,721 that copolyesters containing 1,2-bis(2-chlorophenoxy)ethane-4,4'-dicarboxylic acid as a copolymer component are melt-processable and excellent in mechanical properties. However, these polyesters are limited in their practical application, since these copolyesters have rather low heat distortion temperatures in the range of from 112° C. to 142° C. When the molded articles of these polymers are applied to electronic parts, the molded articles are required to have a high heat distortion temperature for excellent solder resistance.

SUMMARY OF THE INVENTION

It is an object of this invention to provide a thermotropic liquid crystal polyester excellent in melt-processability.

It is another object of this invention to provide a thermotropic liquid crystal polyester having excellent mechanical properties and high heat distortion temperature.

Further, it is another object of this invention to provide a thermotropic liquid Crystal polyester excellent in. heat resistance and hydrolysis resistance.

It is yet another object of this invention to provide a thermotropic liquid crystal polyester excellent in economy.

According to this invention, there is provided a melt-processable copolyester comprising:

a structural unit (I) of formula (1—1)

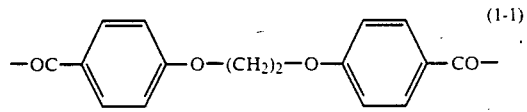

and formula (1—2)

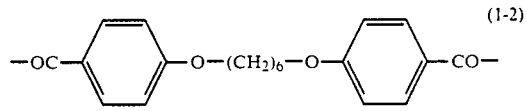

wherein the amount of the species of formula (1—2) is 5 to 95 mole% of the structural unit (I), a structural unit (II) of formula (2)

wherein X is at least one selected from the group consisting of

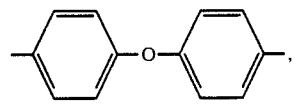

and a structural unit (III) of formula (3)

wherein Y is at least one selected from the group consisting of

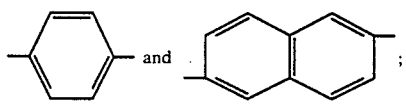

the proportion of the structural unit (III) being 10 to 80 mole% of the structural units (I)+(II)+(III) in total, the structural unit (I) being substantially equimolar to the structural unit (II), the inherent viscosity (ln $\eta_{rel}$)/C, measured in a concentration of 0.16 g/dl in pentafluorophenol at 60° C., being not less than 0.5 dl/g.

DETAILED DESCRIPTION OF THE INVENTION

In the copolymerization polyester of this invention, the structural unit (I) of formula (1—1) and formula (1—2) represents a dicarboxylic acid moieties of 1,2-bis(phenoxy)ethane-4,4′-dicarboxylic acid and 1,6-bis(phenoxy)hexane-4,4′-dicarboxylic acid.

No limitation is imposed on the process for the production of 1,6-bis(phenoxy)hexane-4,4′-dicarboxylic acid. It may be produced, for example, by the following process.

First, methyl p-hydroxy benzoic acid or ethyl p-hydroxy benzoic acid and 1,6-hexanedichloride or 1,6-hexanedibromide are reacted in an aprotic polar solvent such as dimethylformamide in the presence of an alkali such as sodium carbonate to produce methyl 1,6-bis(-phenoxy)hexane-4,4′-dicarboxylic acid or ethyl 1,6-bis(-phenoxy)hexane-4,4′-dicarboxylic acid. Then, the above product is saponified with an alkali such as potassium hydroxide, and the resultant product is acidified with hydrochloric acid, etc., to give 1,6-bis(phenoxy)-hexane-4,4′-dicarboxylic acid.

The other 1,2-bis(phenoxy)ethane-4,4′-dicarboxylic acid can be produced nearly in the same way as in the process for the production of 1,6-bis(phenoxy)hexane-4,4′-dicarboxylic acid.

In this invention, the structural unit (I) consists of species represented by formula (1-1) and formula (1-2), and the amount of the species of formula (1-2) is 5 to 95 mole%, preferably 20 to 80 mole %, of the structural unit (I).

The formula (2) for the structural unit (II) represents dihydroxy compound moieties such as hydroquinone, 4,4′-dihydroxybiphenyl, 4,4′-dihydroxydiphenyl ether, etc., and the structural unit (II) may comprise one component or more selected from these.

The structural unit (III) of the formula (3) is comprised of at least one of p-hydroxybenzoic acid and 6-hydroxy-2-naphthoic acid moieties.

The copolyester of this invention is melt-processable at a temperature below 300° C., and makes it possible to obtain molded articles having excellent mechanical properties, heat resistance and hydrolysis resistance by the use of an ordinary injection molding machine usable for molding of engineering plastics.

In this invention, the proportion of the structural unit (III) is 10 to 80 mole %, preferably not less than 40 mole %, of the units (I)+(II)+(III) in total. In the case when the proportion is not more than 10 mole % or not less than 80 mole %, the resultant copolyester has poor melt-processability and does not make it possible to achieve the objects of this invention.

The copolyester of this invention has an inherent viscosity (ln$\eta_{rel}$)/C, measured in a Concentration of 0.16 g/dl in pentafluorophenol at 60° C., of not less than 0.5, preferably 1.0 to 10. When the inherent viscosity is less than 0.5, the resultant molded articles have low strength, and a inherent viscosity of more than 10 causes a difficulty in melt-processing.

The copolyester according to this invention is not only superior to usual aromatic polyesters such as polyethylene terephthalate in heat resistance and hydrolysis resistance, but it is also superior even to that liquid crystal polyester formed from polyethylene terephthalate and p-acetoxybenzoic acid which is described in U.S. Pat. No. 3,778,410, in heat resistance and hydrolysis resistance. And it is less expensive and has better melt-processability than that liquid crystal wholly aromatic polyester formed from p-hydroxybenzoic acid and 6-hydroxy-2-naphthoic acid which is described in U.S. Pat. No. 4,161,470. Further, the copolyester according to this invention has a higher distortion temperature than that disclosed in U.S. Pat. No. 4,746,721.

The copolyester of this invention can be produced according to conventional polycondensation process for producing polyesters. For example, it can be produced by reacting a dicarboxylic acid or its ester which forms a moiety of the formula (1—1) and formula (1—2) for the structural unit (I), an aromatic hydroxycarboxylic acid or its ester which forms a moiety of the formula (3) for the structural unit (III) and an aromatic hydroxy compound or its ester which forms a moiety of the formula (2) for the structural unit (II). Typical examples of the process for the production thereof include the following processes (a) and (b).

(a) Acetic acid-removing polycondensation reaction: reaction of 1,2-bis(phenoxy)ethane-4,4′-dicarboxylic acid, 1,6-bis(phenoxy)hexane-4,4′-dicarboxylic acid, p-acetoxybenzoic acid and hydroquinone diacetate; reaction of 1,6-bis(phenoxy)hexane-4,4′-dicarboxylic acid, 1,2-bis(phenoxy)ethane-4,4′-dicarboxylic acid, 6-acetoxy-2-naphthoic acid and hydroquinone diacetate; reaction of 1,6-bis(phenoxy)hexane-4,4′-dicarboxylic acid, 1,2bis(phenoxy)ethane-4,4′-dicarboxylic acid, p-acetoxybenzoic acid, 6-acetoxy-2-naphthoic acid and 4,4′-diacetoxydiphenyl ether;

(b) Phenol-removing polycondensation reaction: reaction of a diphenyl ester compound of 1,2-bis(phenoxy)ethane-4,4′-dicarboxylic acid, a diphenyl ester compound of 1,6-bis(phenoxy)hexane-4,4′-dicarboxylic acid, p-hydroxybenzoic acid and hydroquinone; reaction of a diphenyl ester compound of 1,6-bis(phenoxy)-hexane-4,4′-dicarboxylic acid, a diphenyl ester compound of 1,2-bis(phenoxy)ethane4,4′-dicarboxylic acid, 6-hydroxy-2-naphthoic acid and hydroquine; reaction of a diphenyl ester compound of 1,6-bis(phenoxy)hexane-4,4′-dicarboxylic acid, a diphenyl ester compound of 1,2-bis(phenoxy)ethane-4,4′-dicarboxylic acid, p-hydroxybenzoic acid, 6-hydroxy-2-naphthoic acid and 4,4′-diacetoxydiphenyl ether; etc.

Among the above processes, the process (a) is more desirable since the polycondensation reaction in the process (a) proceeds without any catalyst. And yet, in the above process (b), metal compounds such as stannous acetate, tetrabutyltitanate, etc., can be used as a catalyst for the polycondensation reaction.

The copolyester obtained by this invention is excellent in mechanical properties, melt-processable at a temperature below 300° C., capable of giving molded articles having excellent heat resistance, high heat distortion temperature and hydrolysis resistance, and industrially better than conventional thermotropic liquid crystal polyesters, e.g., those described in U.S. Pat. Nos. 4,161,470, 4,746,721 and 3,778,410.

The copolyester of this invention may contain a filler, stabilizer, glass fiber, fire retardant and other additives.

EXAMPLES, COMPARATIVE EXAMPLES AND SYNTHESIS EXAMPLES

This invention will be illustrated in detail according to Examples, etc., hereinbelow. However, it shall never be limited thereto.

The inherent viscosity (1n $\eta_{rel}$)/C of a copolyester in each of examples, etc., was determined according to the following method.

Sample solution: Pentafluorophenol solution having a Concentration 0.5 g/dl of a sample.

Viscometer: Ubbelode capillary viscometer having a flow time of 286 seconds for a flow of pentafluorophenol only.

Measurement temperature: 60° C.+0.01° C.

According to the above method, the flow time of a sample solution was measured to obtain $\eta_{rel}$, and the inherent viscosity (1n$\eta_{rel}$)/C was calculated.

The intrinsic viscosity was determined by the following method.

Sample solution: Phenol/tetrachloroethane (=60/40 by weight) solution having a concentration 0.5 g/dl of a sample.

Viscometer: Ubbelode capillary viscometer having a flow time of 40 seconds for a flow of phenol/tetrachloroethane (60/40 by weight).

Measurement temperature: 25°) C.+0.01° C.

According to the above method, the flow time of a sample solution was measured to obtain $\eta_{sp}$/C. And the viscosity at a concentration of zero (0) was extraporated, and the intrinsic viscosity [$\eta$] was determined.

Thermal analysis was made on 2 to 20 mg of samples in 300 ml/min. of dry air at a temperature elevation rate of 10° C./min by the use of TG/DTA 200 made by Seiko Electronics.

Td (° C.) stands for a thermal decomposition temperature at which a sample starts to be decomposed.

The temperature (Tm) indicating an endotherm of a melting polymer was measured on 10 mg of a sample in a nonclosed aluminum container in nitrogen gas current (30 ml/min.) at a temperature elevation rate of 20° C./min. by the use of a differential scanning calorimeter (DSC), model SSC/560S made by Seiko Electronics.

The apparent melt viscosity was measured by using a flow tester CFT-500 made by Shimadzu Corporation. The tester had a 1 mm$\phi$×2 mm die and 10 kg of a load.

The optical anisotropy was determined by placing a sample of the polymer on a Metler hot stage of a Nikon polarizing microscope Optiphoto-POL.

A sample was molded into Dumbell test specimen by using an in3action molding machine (FANUC AUTO-SHOT 100B made by FANUC Ltd.) under the conditions shown in the following Table. The heat distortion temperature (HDT) of the test specimen was measured under a load of 18.6 kg/cm² in accordance with ASTM D648.

| Cylinder temperatures | |
| --- | --- |
| Rear portion | 275° C. |
| Middle portion | 280° C. |
| Front portion | 280° C. |
| Nozzle portion | 285° C. |
| Mold temperature | 80° C. |
| Molding cycle | |
| Injection | 1.6 seconds |
| Pressure maintenance | 4 seconds |
| Cooling | 60 seconds |
| Rotating speed of the screw | 150 rpm |
| Injection pressure | 800 kg/cm² |

SYNTHESIS EXAMPLES

The following are processes employed to produce 1,6-bis(phenoxy)hexane-4,4'-dicarboxylic acid and 1,2-bis(phenoxy)ethane-4,4'-dicarboxylic acid used in the production of copolyesters in Examples.

SYNTHESIS EXAMPLE 1

Synthesis of 1,6-bis(phenoxy)hexane-4,4'-dicarboxylic acid ("BHB-1") (I):

Methyl p-hydroxybenzoate (91.2 g), 46.6 g of 1,6-hexanedichloride, 600 ml of dimethylformamide and 34.9 g of sodium carbonate were charged into a 1 liter autoclave with a stirrer, thermometer, pressure gauge and nitrogen gas-introducing tube. The autoclave was closed, the charged materials were stirred and the temperature elevation was started. The reaction was carried out at 120° C. for 7 hours. Thereafter, the temperature was elevated to 130° C. and the reaction was continued for 7 hours. During the latter reaction, the pressure inside the autoclave was 5 kg/cm².

The reaction liquid was cooled, a precipitate was filtered and a separated crude methyl 1,6-bis(phenoxy)-hex 1,6-bis(phenoxy)hexane-4,4'-dicarboxylate was washed with water, and then with methanol to give 85.6 g of white plate-like crystals. 50 g of the white plate-like crystals was charged into a glass separable flask with a stirrer, thermometer and nitrogen gas-introducing tube, 900 ml of ethyl alcohol and 52 g of sodium hydroxide were added. The mixture was treated under heat at 80° C. for 4 hours to saponify the methyl 1,6-bis(phenoxy)-hexane-4,4'-dicarboxylate. 2,000 ml of water and 100 ml of 35 % hydrochloric acid were added to the above treated liquid for neutralization to give crude 1,6-bis(-phenoxy)hexane-4,4'-dicarboxylic acid. The treatment by washing with water and filtration were repeated to give 37 g of high-purity 1,6-bis(phenoxy)hexane-4,4'-dicarboxylic acid (to be referred to as "BHB-1" hereinbelow).

SYNTHESIS EXAMPLE 2

Synthesis of 1,2-bis(phenoxy)ehtane-4,4'-dicarboxylic acid (BEB-1) (II):

p-Hydroxybenzoic acid (110.5 g), 66.0 g of sodium hydroxide and 700 ml of water were charged into a 1 liter autoclave with a stirrer, thermometer, pressure gauge, nitrogen gas-introducing tube and dropping funnel, and the temperature was elevated with stirring. When the temperature of the mixture liquid reached 70° C., the heating was stopped, and 39.6 g of 1,2-ethylenedichloride was added dropwise over ]hour with maintaining the above temperature. After the addition was finished, the autoclave was closed and the temperature was elevated to 120° C. to continue the reaction for 6 hours. During the reaction, the pressure inside the autoclave was 3.7 to 5.4 kg/cm².

After the reaction liquid was cooled, 150 ml of 35 % hydrochloric acid was added, and a precipitate was filtered. The separated crude 1,2-bis(phenoxy)ethane-4,4'-dicarboxylic acid was washed with water and then with methanol to give 60.5 g of 1,2-bis(phenoxy)ethane-4,4'-dicarboxylic acid (to be referred to as "BEB-1" hereinbelow).

EXAMPLE 1 p-Acetoxybenzoic acid (108 g, 0.6 mole), 38.8 g (0.2 mole) of hydroquinonediacetate, 53.8 g (0.15 mole) of "BHB-1" and 15.1 g (0.05 mole) of "BEB-1" were charged into a 300 ml reaction vessel with a stirrer, thermometer, pressure gauge, nitrogen gas-introducing tube and condenser, the purging with nitrogen was carried out 3 times and the temperature was elevated with slowly stirring and with introducing a small amount of nitrogen into the vessel. The temperature of the resultant mixture was elevated stepwise to carry out reactions at 240° C. for 1.9 hours and at 250° C. for 0.2 hour. The stirring was speeded up and the reaction was carried out at 270° C. for 2.0 hours. At this stage, 55 g of acetic acid was distilled off. Then, the pressure of the reaction vessel was gradually reduced, and while the pressure was maintained at a vacuum of 0.5 Torr, the reaction product was stirred at 300° C. for 1.9 hours, at 320° C. for 20 minutes and at 350° C. for 20 minutes to complete the polymerization.

The resultant polymer ("A-1") had an inherent viscosity of 1.98. This polymer, which was subjected to a differential scanning calorimeter (DSC), showed a sharp melt-endotherm at about 277° C., and it showed an endotherm at about 275° C. when it was resubjected to the DSC. The heat distortion temperature (HDT) of a molded article therefrom was 228° C. This polymer in the melt phase exhibited optical anisotropy.

EXAMPLES 2-5

The procedure of Example 1 was repeated by changing the proportions of p-acetoxybenzoic acid, hydroquinone diacetate, "BHB-1" and "BEB-1", to prepare polymers "A-2" to "A-5". Table 1 shows the inherent viscosities, temperatures (Tm) which exhibit melt-endotherm by DSC, thermal decomposition temperatures (Td) of the resultant polymers, and heat distortion temperatures (HDT) of molded articles from the polymers. All of these polymers in the melt phase exhibited optical anisotropy.

COMPARATIVE EXAMPLE 1

Terephthalic acid (1,495 g, 9.0 moles) and 838 g (13.5 moles) of ethylene glycol were charged in this order into a 5 l reaction vessel with a stirrer, thermometer, pressure gauge, nitrogen gas-introducing tube and condenser, and the stirring at a low speed was started. The purging with nitrogen was carried out 3 times and then the pressure inside the vessel was adjusted to 2 kg/cm$^2$ by nitrogen. With stirring at 200 rpm, the temperature elevation was started.

With taking care that the internal pressure did not exceed 2.5 kg/cm$^2$, a dehydration condensation reaction was carried out at 215 to 240° C. to obtain an initial condensate. 1.3 g of triphenylphosphate and 0.4 g of germanium dioxide was added to the initial condensate, and the mixture was stirred for 5 minutes and then transferred to a 5 l polycondensation vessel. The temperature was elevated with stirring, and when it reached 280° C., the pressure was gradually reduced and adjusted to 0.5 Torr for about 30 minutes. A polycondensation reaction was carried out with maintaining the degree of vacuum at not more than 0.5 Torr, and at the time when a predetermined torque was reached, the reaction was stopped to give a polyethylene terephthalate "B-1". The "B-1" had an intrinsic viscosity of 0.62 and a terminal carboxyl group concentration of 18.7 eq/10$^6$ g (eq=equivalent).

Table 1 shows intrinsic viscosity, Td and Tm (a temperature exhibiting melt-endotherm by DSC) of the "B-1".

COMPARATIVE EXAMPLE 2

The "B-1" in an amount of 76.8 g and 108 g of p-acetoxybenzoic acid were charged into a 300 ml reaction vessel with a stirrer, thermometer, pressure gauge, nitrogen gas-introducing tube, distillation head connected to a condenser, etc., and the purging with nitrogen was carried out 3 times. The mixture was stirred under nitrogen atmosphere at 275° C. for about 1 hour to carry out an acetic acid-removal reaction, and then the polycondensation was carried out at a vacuum degree of not more than 0.5 Torr for 4 hours to give a polyester "B-2" having an intrinsic viscosity of 0.59 and a terminal carboxyl group concentration of 14 9 eq/10$^6$ g. This polymer in the melt phase exhibited optical anisotropy.

Table 1 shows intrinsic viscosity, Td and Tm of the polymer "B-2".

COMPARATIVE EXAMPLES 3 and 4

Example 1 was repeated except that only one of BHB-1 and BEB-1 was used as shown in Table 1 to give polymers "B-3" and "B-4".

Table 1 shows the inherent viscosity, Tm and Td of each of the polymers "B-3" and "B-4", and HDT of molded articles therefrom.

TABLE 1

| | Copolyester No. | Material formulation (mol) | | | | Copolyester inherent viscosity | Tm (°C.) | Td (°C.) | HDT (°C.) |
|---|---|---|---|---|---|---|---|---|---|
| | | BHB-1 | BEB-1 | HQDA | ABA | | | | |
| Example | | | | | | | | | |
| 1 | A-1 | 15 | 5 | 20 | 60 | 1.98 | 277 | 417.3 | 228 |
| 2 | A-2 | 10 | 10 | 20 | 60 | 0.56 | 268 | 419.5 | 195 |
| 3 | A-3 | 5 | 15 | 20 | 60 | 0.72 | 275 | 419.0 | 175 |
| 4 | A-4 | 15 | 15 | 30 | 40 | 3.60 | 235 | 418.5 | 168 |
| 5 | A-5 | 20 | 20 | 40 | 20 | 2.35 | 222 | 415.4 | 165 |
| Comparative Example | | | | | | | | | |
| 1 | B-1 | Polyethyleneterephthalate | | | | 0.62* | 260 | 387.3 | |
| 2 | B-2 | Polyethyleneterephthalate/ ABA = 40/60 (molar ratio) | | | | 0.59* | 200 | 396.9 | |
| 3 | B-3 | 20 | 0 | 20 | 60 | 2.01 | 292 | 415.7 | 227 |

TABLE 1-continued

| Copolyester No. | Material formulation (mol) | | | | Copolyester inherent viscosity | Tm (°C.) | Td (°C.) | HDT (°C.) |
| --- | --- | --- | --- | --- | --- | --- | --- | --- |
| | | BHB-1 | BEB-1 | HQDA | ABA | | | | |
| 4 | B-4 | 0 | 20 | 20 | 60 | 1.05 | 282 | 416.9 | 152 |

Note:
HQDA: Hydroquinone diacetate
ABA: p-Acetoxybenzoic acid
Tm: Temperature exhibiting melt-endotherm by DSC
Td: Thermal decomposition temperature
*: Intrinsic viscosity measured by using phenol/tetrachloroethane = 60/40 (by weight) as a solvent at 25° C.

EXAMPLE 6

Thermal stabilities of the copolyester "A-1" obtained in Example 1, the polyethylene terephthalate "B-1" obtained in Comparative Example 1, the copolyester "B-2" obtained in comparative Example 2 and the copolyester "B-3" obtained in Comparative Example 3 were compared by measuring apparent melt viscosities of the samples of the above polymers which had been held inside a die for a predetermined period of time, by the use of a flow tester CFT-500 made by Shimadzu Corporation.

Table 2 shows the results of the above measurements. It is clear that the "A-1" is superior to the "B-1", "B-2" and "B-3" in thermal stability.

TABLE 2

| Co-polyester | Temperature [°C.] | Hold time [second] | Apparent Viscosity [poise] | viscosity maintenance ratio [%] |
| --- | --- | --- | --- | --- |
| A-1 | 290 | 120 | 1154 | 100.0 |
| | | 300 | 1282 | 111.1 |
| | | 600 | 1369 | 118.6 |
| | | 900 | 1179 | 102.2 |
| A-1 | 280 | 120 | 2345 | 100.0 |
| | | 300 | 2380 | 101.5 |
| | | 600 | 2319 | 98.9 |
| B-1 | 280 | 120 | 5351 | 100.0 |
| | | 300 | 4822 | 90.1 |
| | | 600 | 3589 | 67.1 |
| B-2 | 280 | 120 | 215 | 100.0 |
| | | 300 | 196 | 91.1 |
| | | 600 | 154 | 71.6 |
| B-3 | 295 | 120 | 25730 | 100.0 |
| | | 600 | 26240 | 102.0 |
| | 310 | 120 | 5832 | 100.0 |
| | | 600 | 5940 | 101.9 |

EXAMPLE 7

6-Acetoxy-2-naphthoic acid (55.2 g, 240 mmols), 15.5 g (80 mmoles) of hydroquinone diacetate, 14.3 g (40 mmoles) of the "BHB-1" and 12.1 g (40 mmoles) of the "BEB-1" were charged into a 300 ml reaction vessel with a stirrer, thermometer, pressure gauge, nitrogen gas-introducing tube and a distillation head connected to a condenser, the purging with nitrogen was carried out 3 times and the temperature was elevated while the mixture was being slowly stirred and a small amount of nitrogen was being introduced into the vessel. The temperature of the resultant mixture was elevated stepwise to carry out reactions at 240° C. for 3.0 hours and at 250° C. for 1.5 hours. The stirring was speeded up and the reaction was Carried out at 260° C. for 4.5 hours. Then, the pressure of the reaction vessel was gradually reduced, and while the pressure was maintained at a vacuum of 0.15 Torr, the reaction product was stirred at 280° C. for 2.0 hours and at 300° C. for 2 hours to complete the polymerization.

The resultant polymer ("A-6") had an inherent viscosity of 1.21. This polymer, which was subjected to a differential scanning calorimeter (DSC), showed a sharp melt-endotherm at about 232° C., and it showed an endotherm at about 235° C. when it was resubjected to the DSC. This polymer in the melt phase exhibited optical anisotropy.

EXAMPLES 8–11

The procedure of Example 1 was repeated by changing the proportions of p-acetoxybenzoic acid, 6-acetoxy-2-naphthoic acid, hydroquinone diacetate, "BHB-1" and "BEB-1", to prepare polymers "A-7" to "A-10". Table 3 shows the inherent viscosities, temperatures (Tm) which exhibit melt-endotherm by DSC, thermal decomposition temperatures (Td) of the resultant polymers and heat distortion temperatures (HDT) of molded articles therefrom. All of these polymers in the molten state exhibited optical anisotropy.

TABLE 3

| Example | Copolyester No. | Material formulation (mol) | | | | | Copolyester inherent viscosity | Tm (°C.) | Td (°C.) | HDT (°C.) |
| --- | --- | --- | --- | --- | --- | --- | --- | --- | --- | --- |
| | | BHB-1 | BEB-1 | HQDA | ANA | ABA | | | | |
| 7 | A-6 | 10 | 10 | 20 | 60 | | 1.21 | 232 | 435 | 167 |
| 8 | A-7 | 8.5 | 8.5 | 17 | 66 | | 1.15 | 274 | 436 | 175 |
| 9 | A-8 | 7.5 | 7.5 | 15 | 70 | | 1.06 | 296 | 438 | 220 |
| 10 | A-9 | 7.5 | 7.5 | 15 | 21 | 49 | 2.36 | 244 | 416 | 170 |
| 11 | A-10 | 7.5 | 7.5 | 15 | 14 | 56 | 2.85 | 296 | 420 | 220 |

Note
ANA: 6-Acetoxy-2-naphtoic acid

ANA: 6-Acetoxy-2-naphtoic acid

EXAMPLE 12

Thermal stability of each of the copolyesters "A-8" and "A-9" obtained in Examples 9 and 10 was compared with that of the other by measuring apparent melting viscosities of the Samples of the above polymers Which had been held inside a die for a predetermined period of time, by the use of a flow tester CFT-500 made by Shimadzu Corporation.

Table 4 shows the results of the above measurements. It is clear that the thermal stability of each of the "A-8" and "A-9" is superior to those of the "B-1", "B-2" and "B-3" shown in Table 2.

TABLE 4

| Co-polyester | Temperature [°C.] | Hold time [second] | Apparent Viscosity [poise] | viscosity maintenance ratio [%] |
| --- | --- | --- | --- | --- |
| A-8 | 280 | 120 | 9950 | 100.0 |
|  |  | 300 | 10820 | 108.7 |
|  |  | 600 | 10040 | 100.9 |
| A-9 | 280 | 120 | 3730 | 100.0 |
|  |  | 300 | 3540 | 94.9 |
|  |  | 600 | 3430 | 92.0 |

EXAMPLE 13 p-Acetoxybenzoic acid (37.8 g, 210 mmoles), 14.2 g 52.5 mmoles) of 4,4'-diacetoxybiphenyl, 9.g (26.3 mmoles) of the "BHB-1" and 7.93 g (26.3 mmoles) of the "BEB-1" were charged into a 300 ml reaction vessel with a stirrer, thermometer, pressure gauge, nitrogen gas-introducing tube and a distillation head connected to a condenser, the purging with nitrogen was carried out 3 times and the temperature was elevated while the mixture was being slowly stirred and a small amount of nitrogen was being introduced into the vessel. The temperature of the resultant mixture was elevated stepwise to carry out reactions at 240° C. for 3.5 hours and at 250° C. for 1.5 hours. The stirring was speeded up and the reaction was carried out at 280° C. for 1.5 hours. Then, the pressure of the reaction vessel was gradually reduced, and while the pressure was maintained at a vacuum of 0.3 Torr, the reaction product was stirred at 300° C. for 2.0 hours and at 320° C. for 3.0 hours to complete the polymerization.

The resultant polymer ("A-11") had an inherent viscosity of 2.47. This polymer, which was subjected to a differential scanning calorimeter (DSC), showed a sharp melt-endotherm at about 271° C., and it showed an endotherm at about 275° C. when it was resubjected to the DSC. This polymer in the melt phase exhibited optical anisotropy.

EXAMPLES 14-19

The procedure of Example 13 was repeated by changing the proportions of p-acetoxybenzoic acid, 6-acetoxy-2-naphthoic acid, 4,4'-diacetoxydiphenylether, 4,4'-diacetoxybiphenyl, "BHB-1" and "BEB-1", to prepare polymers "A-12" to "A-17". Table 5 shows the inherent viscosities, temperatures (Tm) which exhibit melt-endotherm by DSC and thermal decomposition temperatures (Td) of the resultant polymers. All of these polymers in the melt phase exhibited optical anisotropy.

EXAMPLE 20

Thermal stability of each of the copolyesters "A-11" and "A-17" obtained in Examples 13 and 19 was compared with that of the other by measuring apparent melt viscosities of the samples of the above polymers which had been held inside a die for a predetermined period of time, by the use of a flow tester CFT-500 made by Shimadzu Corporation.

Table 6 shows the results of the above measurements. It is clear that the thermal stability of each of the "A-11" and "A-17" is superior to those of the "B-1", "B-2" and "B-3" shown in Table 2.

TABLE 5

| Example | Copolyester No. | Material formulation (mol) BHB-1 | BEB-1 | DABP | DADE | ABA | ANA | Copolyester inherent viscosity | Tm (°C.) | Td (°C.) |
| --- | --- | --- | --- | --- | --- | --- | --- | --- | --- | --- |
| 13 | A-11 | 8.5 | 8.5 | 17 |  | 66 |  | 2.47 | 271 | 410 |
| 14 | A-12 | 15 | 5 | 20 |  | 60 |  | 1.30 | 246 | 412 |
| 15 | A-13 | 8.5 | 8.5 |  | 17 | 66 |  | 1.12 | 272 | 419 |
| 16 | A-14 | 15 | 5 | 20 |  |  | 60 | 1.45 | 225 | 425 |
| 17 | A-15 | 15 | 5 |  | 20 |  | 60 | 1.46 | 220 | 426 |
| 18 | A-16 | 7.5 | 7.5 | 15 |  | 56 | 14 | 2.52 | 202 | 424 |
| 19 | A-17 | 7.5 | 7.5 |  | 15 | 56 | 14 | 2.79 | 204 | 423 |

Note:
DABP: 4,4'-diacetoxybiphenyl
DADE: 4,4'-diacetoxydiphenyl ether

TABLE 6

| Co-polyester | Temperature [°C.] | Hold time [second] | Apparent Viscosity [poise] | viscosity maintenance ratio [%] |
| --- | --- | --- | --- | --- |
| A-11 | 280 | 120 | 15350 | 100.0 |
|  |  | 300 | 12570 | 81.9 |
|  |  | 600 | 12200 | 79.5 |
| A-17 | 280 | 120 | 2240 | 100.0 |
|  |  | 300 | 1990 | 88.8 |
|  |  | 600 | 1980 | 88.4 |

What we claim is:

1. A melt-processable copolyester consisting essentially of
a structural unit (I) of formula (1—1)

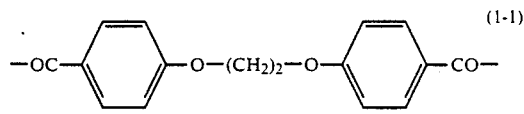

(1-1)

and formula (1—2)

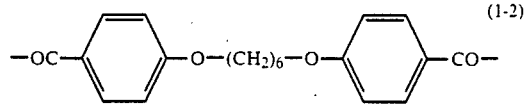

(1-2)

wherein the amount of the species of formula (1—2) is 5 to 95 mole% of the structural unit (I),
a structural unit (II) of formula (2)

—O—X—O— (2)

wherein X is at least one selected from the group consisting of

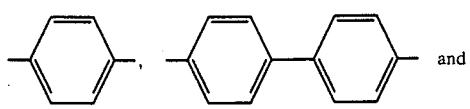 and

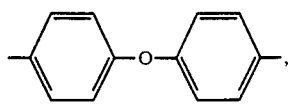

and
a structural unit (III) of formula (3)

—O—Y—CO—   (3)

wherein Y is at least one selected from the group consisting of

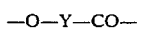 and 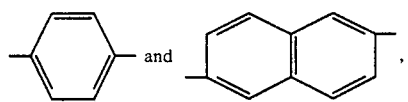, the proportion of the structural unit (III) being 10 to 80 mole% of the structural units (I)+(II)+(III) in total, the structural unit (I) being substantially equimolar to the structural unit (II), the inherent viscosity (1n $\eta_{rel}$)/C, measured in a concentration of 0.16 g/dl in pentafluorophenol at 60° C., being not less than 0.5 dl/g.

2. A copolyester according to Claim 1 wherein the amount of the species of the formula (1—2) is 20 to 80 mole % of the structural unit (I).

3. A copolyester according to claim 1 wherein the inherent viscosity is not more than 10.0.

4. A copolyester according to claim 1 wherein the proportion of the structural unit (III) is 40 to 80 mole % of the structural units (I)+(II)+(III) in total.

5. A copolyester according to claim 1 wherein X in the formula (2) for the structural unit (II) is

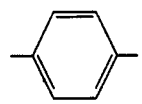

and Y in the formula (3) for the structural unit (III) is

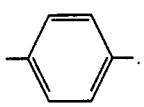.

6. A copolyester according to claim 1 wherein X in the formula (2) for the structural unit (II) is

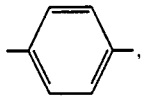, and Y in the formula (3) for the structural unit (III) is

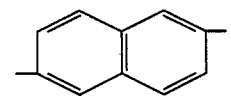

or a mixture of

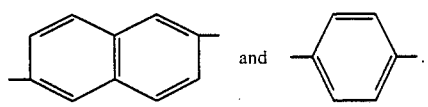.

7. A copolyester according to claim 1 wherein X in the formula (2) for the structural unit (II) represents at least one selected from the group consisting of

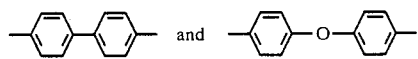

and Y in the formula (3) for the structural unit (III) represents at least one selected from the group consisting of

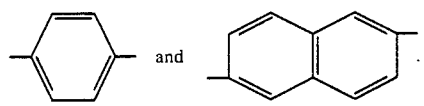.

* * * * *